US011874509B2

(12) United States Patent
Lin

(10) Patent No.: US 11,874,509 B2
(45) Date of Patent: Jan. 16, 2024

(54) OPTICAL FIBER SIGNAL TRANSMISSION JUMPER CONNECTOR STRUCTURE

(71) Applicant: JYH ENG TECHNOLOGY CO., LTD., New Taipei (TW)

(72) Inventor: Yen-Lin Lin, New Taipei (TW)

(73) Assignee: JYH ENG TECHNOLOGY CO., LTD., New Taipei (TW)

( * ) Notice: Subject to any disclaimer, the term of this patent is extended or adjusted under 35 U.S.C. 154(b) by 34 days.

(21) Appl. No.: 17/467,471

(22) Filed: Sep. 7, 2021

(65) Prior Publication Data

US 2023/0075629 A1 Mar. 9, 2023

(51) Int. Cl.
G02B 6/38 (2006.01)
(52) U.S. Cl.
CPC ........... *G02B 6/3879* (2013.01); *G02B 6/387* (2013.01); *G02B 6/3887* (2013.01); *G02B 6/3893* (2013.01)
(58) Field of Classification Search
CPC ...... G02B 6/38; G02B 6/3879; G02B 6/3887; G02B 6/387; G02B 6/3893
See application file for complete search history.

(56) References Cited

U.S. PATENT DOCUMENTS

| 7,712,970 | B1 | 5/2010 | Lee |
| 8,152,385 | B2 | 4/2012 | de Jong et al. |
| 8,678,669 | B2 | 3/2014 | Lee |
| 8,727,638 | B2 | 5/2014 | Lee |
| 8,834,038 | B2 | 9/2014 | Limbert et al. |
| 10,422,966 | B2 * | 9/2019 | Zseng ................ G02B 6/3893 |
| 2020/0271867 | A1 * | 8/2020 | Ishikawa ............. G02B 6/3889 |

* cited by examiner

*Primary Examiner* — Tina M Wong
(74) *Attorney, Agent, or Firm* — Fei-hung Yang

(57) ABSTRACT

An optical fiber signal transmission jumper connector structure includes a connector body, a pair of fiber optic plugs and a sliding sleeve, for connecting a fiber optic socket to achieve signal connections. The fiber optic plugs are installed at the front end of the connector body; the sliding sleeve is slidably covered onto the connector body; the top side of the sliding sleeve has two buckle portions fixed to the fiber optic socket, and two snap holes are formed on a surface of the sliding sleeve and corresponding to two snap hooks of the connector body. The snap hooks can be pressed simultaneously to pull the connector body backward to separate from the sliding sleeve, and the pair of optical fiber plugs can be converted when the optical signal is transmitted while the connector is plugged in the fiber optic socket, so as to improve the convenience of on-site operations.

9 Claims, 10 Drawing Sheets

OPTICAL FIBER SIGNAL TRANSMISSION JUMPER CONNECTOR STRUCTURE

BACKGROUND

Technical Field

The present invention relates to the technical field of communication connectors. More particularly, the present invention relates to an optical fiber signal transmission jumper connector structure that can quickly convert a pair of optical fiber plugs without plugging or unplugging when the optical signal is converted. Using the matching between the connector body, the optical fiber plug, and the sliding sleeve, the original jumper adjustment operation mode is changed greatly to improve the convenience of on-site operation.

Description of Related Art

In the conventional network communication technology, copper wires are generally used as a medium for transmissions, and its transmission method is through the transmission of signals 0 and 1, and both ends of the copper wire are coupled to a signal transceiver, for generating and transmitting a signal such as 0 and 1, and receiving the signal of 0 and 1 transmitted from the other end. However, the following must be taken into consideration in the signal transmission of the copper wire. 1. Transmission Distance: Since the signal transmitted by the copper wire is an electrical signal, and the copper wire is limited by the diameter of its carrier copper wire, and the copper wire itself carries a resistance, therefore if the transmission distance is too long, it will consume the transmitted power and cause a poor signal transmitted to the receiver at the other end. 2. Noise Generated During Transmission: As we all know, an electromagnetic effect occurs when electricity is passing through the copper wire, and the network transmission of a copper wire generally adopts a network cable formed by twisting 8 core wires two by two into four pairs of twisted pair cables, and the 8 core wires will interfere one another during the transmission. Although the signal transceiver can be designed to offset or eliminate the noise signal, yet the higher the frequency, the larger the noise signal. It will be very difficult to eliminate the noise, thus affecting the bandwidth of transmission of the network. In view of the aforementioned technical problem, a transmission method of using optical fiber to transmit light signals is finally developed, and its advantages reside on that: 1. Light transmits signals faster than electricity; 2. The attenuation of light is lower than that of electricity, so that the distance for the optical fiber to transmit signals is much longer than that of the copper wire, its transmission speed is also faster, and the signal transmission capacity is better. Therefore, the fiber optic network gradually becomes a mainstream, but the most fundamental difference between the optical fiber transmission and the copper wire transmission resides on that the same copper wire can perform the task of transmitting signals back and forth simultaneously; on the other hand, both ends of an optical fiber in an optical fiber transmission system are not used as transmitter and receiver respectively at the same time, but one end serves as a transmitter and the other end serves as a receiver for signal transmissions. In order to transmit the signals with a sufficient long distance, the light transmitted by the optical fiber in the optical fiber transmission system not the light we generally use, but it is laser with greater energy, so that the laser transmitter and receiver cannot be integrated as a whole, and signals must be transmitted by pairs of optical fibers in the optical fiber transmission system. In other words, one is responsible for transmitting and the other is responsible for receiving, so as not to cause confusion in the optical signal. Because of this, a fiber optic connector usually combines two connectors together, and thus it is called a duplex fiber optic connector. Due to the limitation of the transmitting end and the receiving end when the optical signals are transmitted, special attention should be paid to connect a fiber optic cable to a fiber optic plug. If the left and right fiber optic connectors are connected reversely, then the optical fiber transmitter or the optical fiber receiver will be damaged. For this reason, various connector products have been developed for quickly switching the transmitter and receiver during jumper operations.

For example, U.S. Pat. No. 7,712,970 entitled "Detachable fiber optic connector" discloses a fiber optic connector structure that assembles two fiber optic plugs together by a top cover shell and a bottom cover shell, and both sides of the top cover shell and the bottom cover shell have two mutually engaging structures respectively, so that when conducting the switching of the jumper operation, the upper cover and the lower cover can first be separated, then the upper cover and the lower cover can be fixed again after the left and right optical fiber plugs are removed and swapped position to complete the jumper operation.

Further, U.S. Pat. No. 8,152,385 entitled "Duplex fiber optic assemblies suitable for polarity reversal and methods therefor" discloses a fiber optic connector that uses a fixed structure to form a groove by both left and right sides, and the groove is provided for engaging two fiber optic plugs. With the fixed structure and the two grooves, the fiber optic connector can be rotated along their axial direction, and finally the fixed structure is sheathed and fixed to a casing.

Further, U.S. Pat. No. 8,678,669 entitled "Reconfigurable polarity detachable connector assembly" discloses a connector assembly that clamps two fiber optic plugs between a top cover shell and a bottom cover shell, and the top cover shell has an springy protruding member, and then a sliding cap is mounted onto the bottom cover shell. After the springy protruding member is pressed and the sliding cap slides backward, the two fiber optic connectors are exposed for the switching of the jumper operation, and then the sliding cap is pushed forwardly back to its original position again. The big problem of this patent is that when switching, the fiber optic connector and the fiber optic cable are moved together, so that the two fiber optic cables will be twisted during the polarity exchange, which may cause the fiber optic cable to become shorter due to the twist, and an incorrect installation position that may damage the fiber optic cable easily.

Further, U.S. Pat. No. 8,727,638 entitled "Fiber channel-inter changeable fiber optic connector" discloses that two fiber optic connectors are installed to a top cover shell and a bottom cover shell and combined to form a front end of a fixing housing, and both of the rear ends of the top and bottom cover shells have an elastic hook, and a casing with a snap slot formed at the top and bottom of the casing covers the top and bottom cover shells to form an outer end of the fixing housing, and the snap slot is combined with the elastic hook of the top and bottom cover shells, so that after the elastic hook is separated from the snap slot of the housing during the polarity switching, each fiber optic connector is turned 180° (upside down) with respect to its axis, and the housing is also turned 180° (upside down) and pushed forwardly back to its original position to complete the switching of optical fiber connector jumper operation. However, when the two fiber optic connectors are turned 180°, the fiber optic cable will also be twisted, which may damage the fiber optic cable and may be damaged easily.

Further, U.S. Pat. No. 8,834,038 entitled "Fiber optic connector" discloses that two fiber optic connector without any elastic plate are covered onto a front end of a shell by a housing, and an elastic plate assembly is mounted on the housing, and the elastic plate assembly has two hooks extending in a direction towards the fiber optic connector and embeddable and engaged with the fiber optic socket, so that users just need to pull up the elastic plate mechanism and change its position to the other side of the housing during the switching of the jumper operation. This structure is the simplest one among those of the aforementioned patents. Although the overall flipping will have the twisting problem, the torsion of the twist can be distributed evenly across the whole fiber optic cable, so that the damage will be smaller than that caused by independent twist or cross twist. However, the structure is simple, so that when the elastic plate assembly is pulled out of the housing, the elastic plate assembly may jump out easily and even be missing in a construction environment.

In the aforementioned U.S. Pat. No. 7,712,970, it mentioned a structure that the top cover and the bottom cover must be separated during the jumper operation. Although the structure is simple, the top and bottom cover shells may be missing very easily in the messy construction site during the construction in an engine room. If the top cover shell or the bottom cover shell is missing, then users will be unable to use the connector. In the aforementioned U.S. Pat. No. 8,152,385, although the issue of missing the top and bottom cover shells can be avoided, the structure is complicated, thus causing inconvenience in assembly and production and increasing the manufacturing cost.

In the aforementioned U.S. Pat. No. 9,625,658, this patent has already improved the foregoing patented technologies, and this patent still has the following drawbacks. Since the elastic plate at the upper end is extended from the rear to the front, and the position of fixing the main body is situated at the rear end, therefore the connector at the front end of the elastic plate may have a positional deviation with respect to the front end. Furthermore, the fiber optic plug has a volume smaller than that of the conventional network plug and a density larger than that of the conventional network plug, so that users will have difficult to reach into the connector by fingers.

In summation, the fiber optic connectors disclosed by the aforementioned patents are modified from the original fiber optic connector assembly and cannot be universally used with the fiber optic connectors installed earlier. Moreover, it will be time-consuming and labor-intensive to replace all of the connectors. Obviously, the conventional fiber optic connectors are very inconvenient to the construction personnel in the engine room and definitely require improvement.

SUMMARY

Therefore, it is a primary objective of the present invention to provide an optical fiber signal transmission jumper connector structure that uses a sliding sleeve to install a connector body from the back to the front, and the sliding sleeve can remain in the fiber optic socket during the operation, which provides a restoration method after a switch or exchange, and can quickly complete the conversion and adjustment of a pair of optical fiber plugs when the optical signal is converted, so as to improve the convenience of on-site operations significantly.

To achieve the aforementioned objective, the present invention discloses an optical fiber signal transmission jumper connector structure pluggable in a fiber optic socket to achieve a signal connection for transmitting a light signal, and the structure includes: a connector body, having a rear end coupled to a fiber optic cable, and a front end configured to be corresponding to the fiber optic cable and divided into two outlet ends, and two fiber optic core wires inside the fiber optic cable are passed out from the two outlet ends respectively, and both outer sides of the connector body have a snap hook; a pair of fiber optic plugs, disposed movably in the two outlet ends respectively, and each of the fiber optic plugs having a fiber optic tube therein, to let each of the fiber optic core wires penetrate into each of the fiber optic tubes respectively, and make a section of each fiber optic core wire pass through each fiber optic tube to transmit optical signals, and a surface of a front end of each of the fiber optic plugs having at least one guide groove; and a sliding sleeve, having an accommodating space defined therein, for passing and accommodating the connector body therein, and an outer side of the sliding sleeve having a snap hole respectively for fixing the two snap hooks to complete an assembly, and a top surface of the sliding sleeve having a pair of buckle portions engaged and fixed into the fiber optic socket, and front ends of the two buckle portions having a positioning hook configured to be corresponsive to each of the guide grooves, and each of the positioning hooks and one of the fiber optic plugs are connected to each other according to each of the guide grooves; wherein the two buckle portions are provided for inserting the sliding sleeve together with the connector body into the fiber optic socket during use, and when it is necessary to adjust optical signal transmission, the two snap hooks are pressed to separate the connector body from the rear of the sliding sleeve, and after switching the positions of the two fiber optic plugs, the connector body is plugged from the rear to the front into the sliding sleeve again to complete the conversion and adjustment operations of the pair of fiber optic plugs.

In an embodiment of the present invention, the guide groove is arranged in a direction corresponding to a linear direction of plugging the connector body into the sliding sleeve. Therefore, after the assembling process, the two fiber optic plugs are positioned and fixed by the positioning hook and can be used stably.

In another embodiment of the present invention, the two buckle portions are integrally formed at a front end of an elastic plate, and a rear end of elastic plate is extended to and disposed at a rear end of the sliding sleeve, and formed into a forwardly extended and curved form, and the center of each of the buckle portions is extended horizontally towards both sides and out from two latch points and engaged and fixed into the fiber optic socket, and the two positioning hooks are disposed under the tip of each of the buckle portions, and the elastic plate can be pressed to separate the two buckle portions from the fiber optic socket to achieve a release effect. Alternatively, the two buckle portions are integrally formed at a front end of the sliding sleeve, and a rear end of the sliding sleeve has a pivoting portion for movably installing a release lever, and a front end of the release lever is extended to a position corresponding to the two buckle portions, so that the release lever is extended backward to the rear of the sliding sleeve. Wherein, the bottom of the release lever proximate to the pivoting portion has a raised portion, and the raised portion is provided for normally abutting a rear section of the release lever against a surface of the fiber optic cable. In addition, the release lever has a rear section configured to be corresponsive to an insert direction of an operator's finger and formed into an upturned curved surface, and the curved surface has an upturned angle falling within a range from 10 degrees to 35 degrees, and when the user's finger is inserted into a gap formed between the curved surface and the fiber optic cable during an operation, the two buckle portions are separated from the fiber optic socket to achieve a release effect.

In addition, the front end surface of each fiber optic core wire forms a mating surface with an included angle between 0 degrees and 8 degrees, which is used for positioning when docking with the fiber optic socket The larger the included angle, the better the positioning effect after the jumper conversion adjustment. However, the included angle is limited by the refraction angle of light, so that the maximum included angle can only be 8 degrees.

DESCRIPTION OF THE EMBODIMENTS

Figure 1:
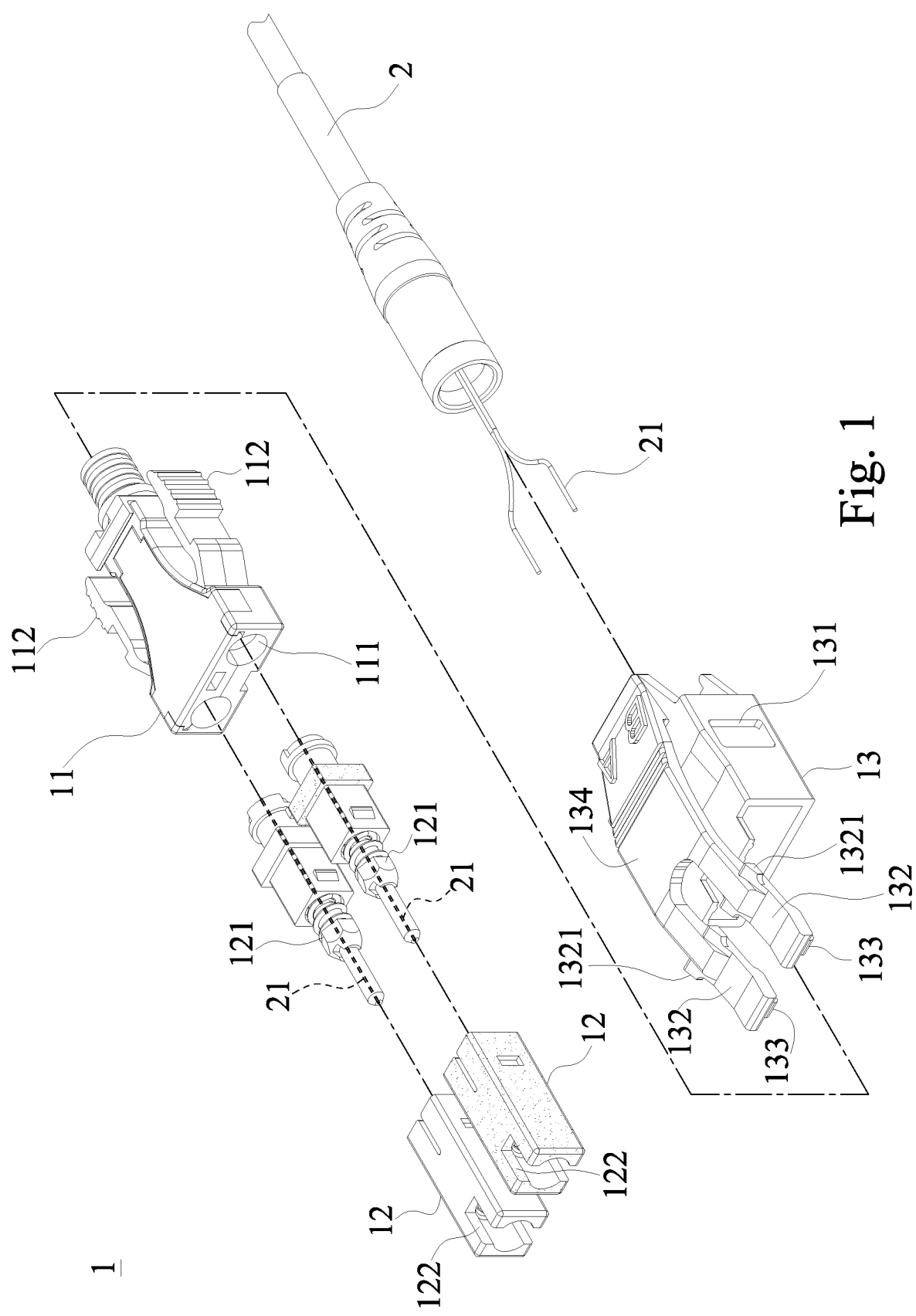
FIG. 1 is an exploded view of a first embodiment of the present invention.
Figure 2:
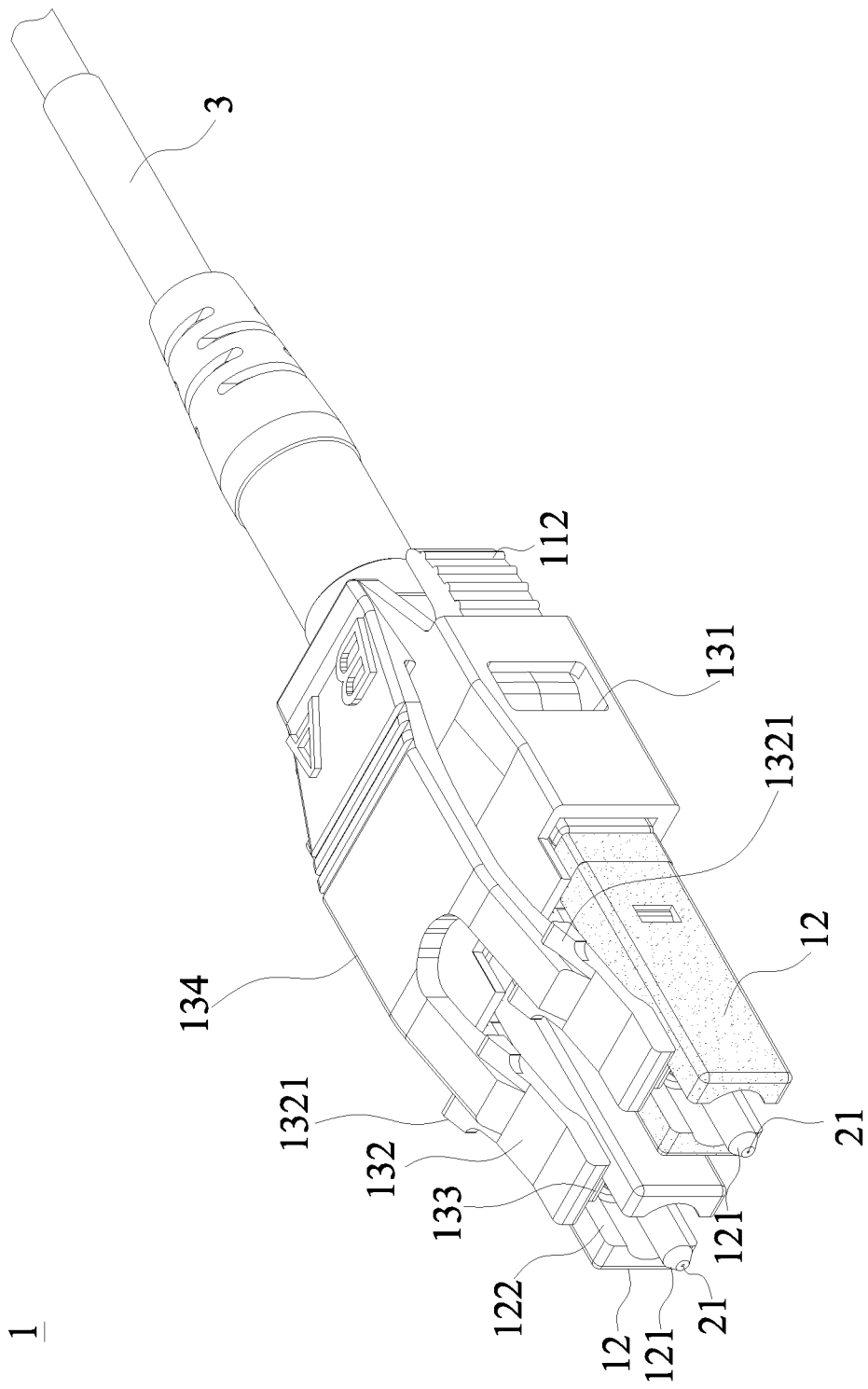
FIG. 2 is a perspective view of a first embodiment of the present invention.

The present invention will become clearer in light of the following detailed description of an illustrative embodiment of this invention described in connection with the drawings.

With reference to FIGS. 1, 2, and 3 to 5 for the exploded view, cross-sectional view and perspective views of a first embodiment of the present invention, and the schematic views of different statuses during operation in accordance with the first embodiment of the invention respectively, an optical fiber signal transmission jumper connector structure 1 of the invention is provided and plugged into a fiber optic socket (not shown in the figure) to complete a signal connection in order to transmit a light signal, and the an optical fiber signal transmission jumper connector structure 1 includes a connector body 11, a pair of fiber optic plugs 12 and a sliding sleeve 13.

Wherein, the connector body 11 has a rear end connected to a fiber optic cable 2, and a front end of the connector body 11 is configured to be corresponsive to the fiber optic cable 2 and divided into two outlet ends 111, and two fiber optic core wires 21 inside the fiber optic cable 2 are passed out from the two outlet ends 111 respectively, and both sides of the connector body 11 have a snap hook 112.

The two fiber optic plugs 12 are movably installed in the two outlet ends 111 respectively, and each of the fiber optic plugs 12 has a section of a fiber optic tube 121, to let each of the fiber optic core wires 21 penetrate into each of the fiber optic tubes 121 respectively, and make a section of each fiber optic core wire 21 pass through each fiber optic tube 121 to transmit optical signals. In addition, the upper surface and lower surface of each of the fiber optic plugs 12 have a guide groove 122, and each of the guide grooves 122 is arranged in a direction corresponding to a linear direction of inserting the connector body 11 into the sliding sleeve 13.

An accommodating space 131 is defined inside the sliding sleeve 13 and provided for passing and accommodating the connector body 11, and an outer side of the sliding sleeve 13 has a snap hole 131 for engaging and fixing the two snap hooks 112 to complete the assembly. In addition, a top side of the sliding sleeve 13 has a pair of buckle portions 132 engaged and fixed into the fiber optic socket 2, and front ends of the two buckle portions 132 have a positioning hook 133 configured to be corresponsive to each respective guide groove 122, and each of the positioning hooks 133 and one of the fiber optic plugs 12 are connected to each other according to each of the guide grooves 122, for plugging the sliding sleeve 13 together with the connector body 11 into the fiber optic socket.

With reference to FIG. 1 for a preferred embodiment of the present invention, the two buckle portions 132 are integrally formed at a front end of an elastic plate 134, and a rear end of the elastic plate 134 is extended to and disposed at a rear end of the sliding sleeve 13, so that the elastic plate 134 is in a forwardly extended and curved form, and two latch points 1321 are extended outwardly from the center of each of the buckle portions 132 and horizontally towards both sides and engaged and fixed into the fiber optic socket. Further, the two positioning hooks 133 are disposed under the tips of the two buckle portions 132 respectively. When the elastic plates 134 are pressed, the two buckle portions 132 are moved downward at the same time, so that the latch points 1321 are separated from the fiber optic socket to achieve the effect of releasing the connector body 11.

With reference to FIGS. 6, 7 and FIGS. 8-10 for the exploded view, cross-sectional view and the perspective view of second embodiment of the present invention, and the schematic views of different statuses during operation in accordance with the second embodiment of the invention respectively. When the optical signal transmission adjustment operation is performed, the way to open the sliding sleeve 13 is to simultaneously press the two snap hooks 112 on both sides. However, there is a slight difference in structure that the two buckle portions 132 of this embodiment are integrally formed at a front end of the sliding sleeve 13, and a rear end of the sliding sleeve 13 has a pivoting portion 135 provided for movably installing a release lever 14, and a front end of the release lever 14 is extended to a position corresponding to the two buckle portions 132, so that the release lever 14 is extended backward to the rear of the sliding sleeve 13, and the bottom of the release lever 14 near the pivoting portion 135 has a raised portion 141, and the raised portion 141 is provided for normally abutting a rear section of the release lever 14 against a surface of the fiber optic cable 2. It is noteworthy that the rear section of the release lever 14 is configured to be corresponsive to the direction of inserting an operator's finger to form an upturned curved surface 142, and the curved surface 142 has an upturned angle falling within a range from 10 degrees to 35 degrees. During the operation of releasing the connector, users just need to insert a finger into a gap formed between the curved surface 142 and the fiber optic cable 3 in order to prop up the rear end of the release lever 14, while the front end of the release lever 14 presses down at the two buckle portions 132, so that the two buckle portions 132 are separated from the fiber optic socket to achieve the release effect.

Figure 3:
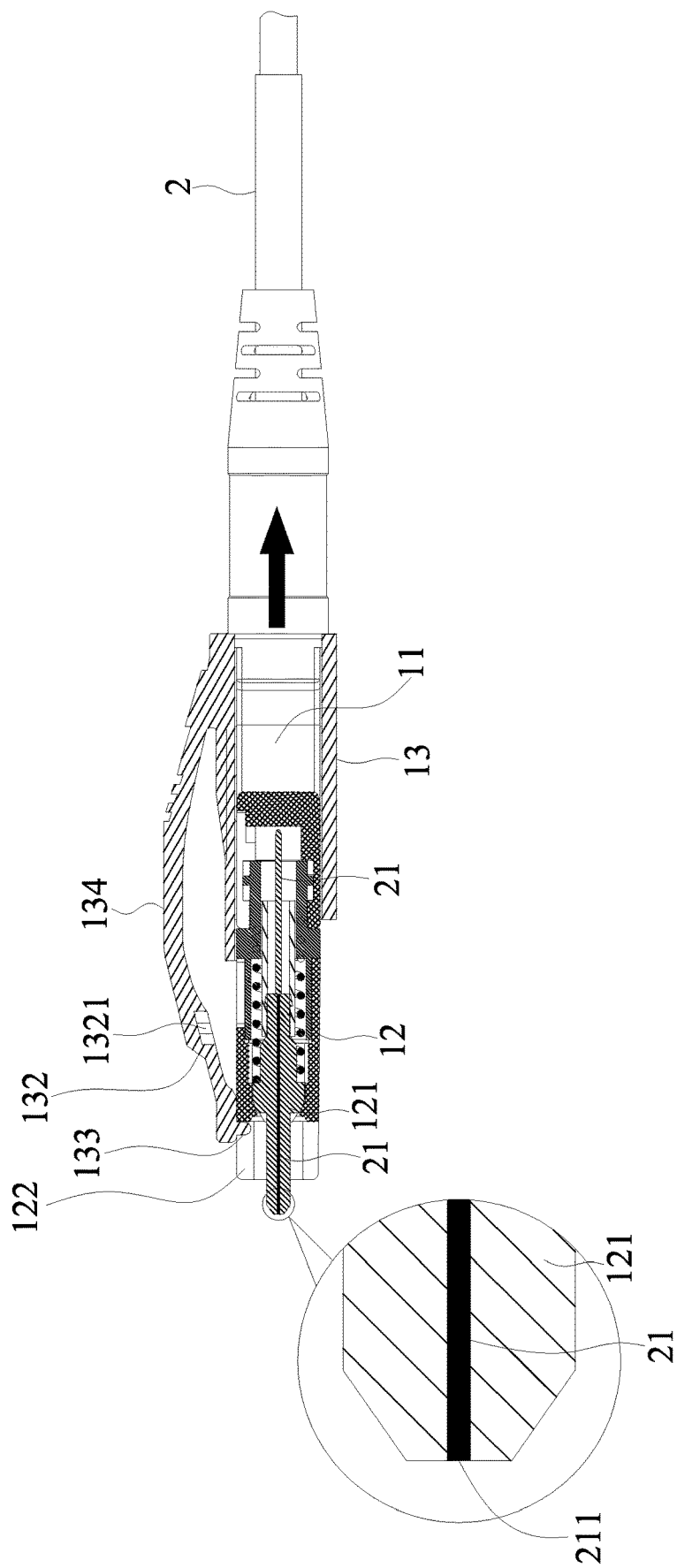
FIG. 3 is an assembled cross-sectional view of the first embodiment of the present invention.
Figure 4:
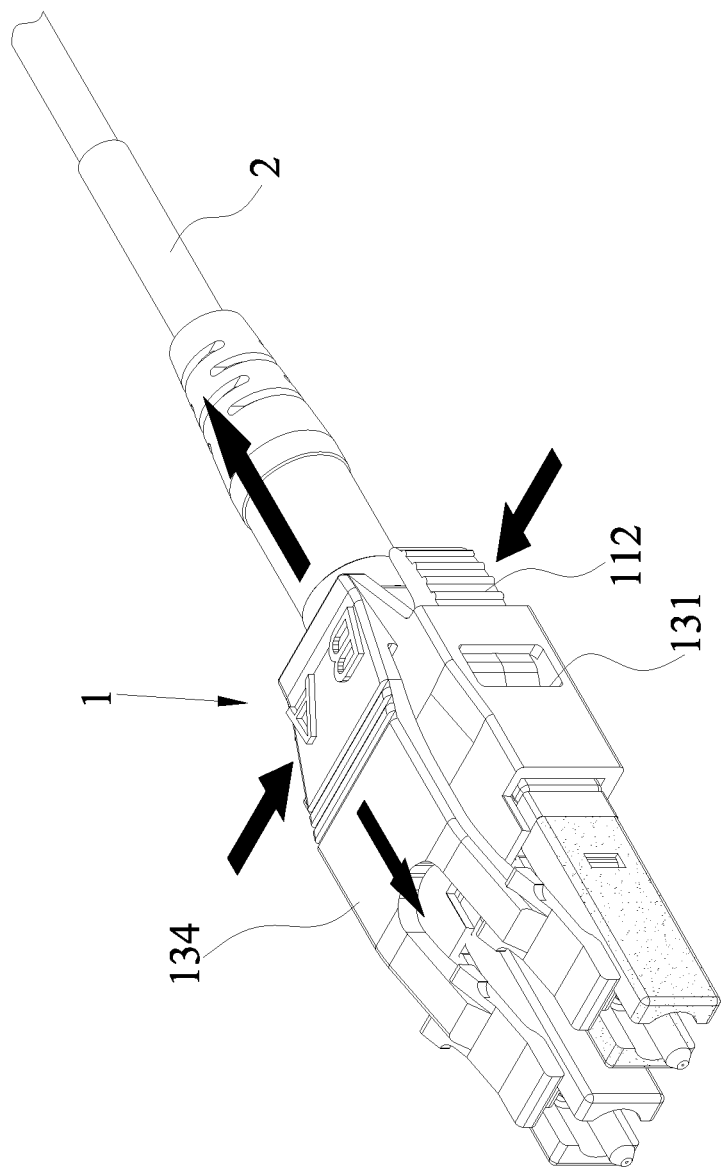
FIG. 4 is a first schematic view showing a status of the first embodiment of the present invention during operation.
Figure 5:
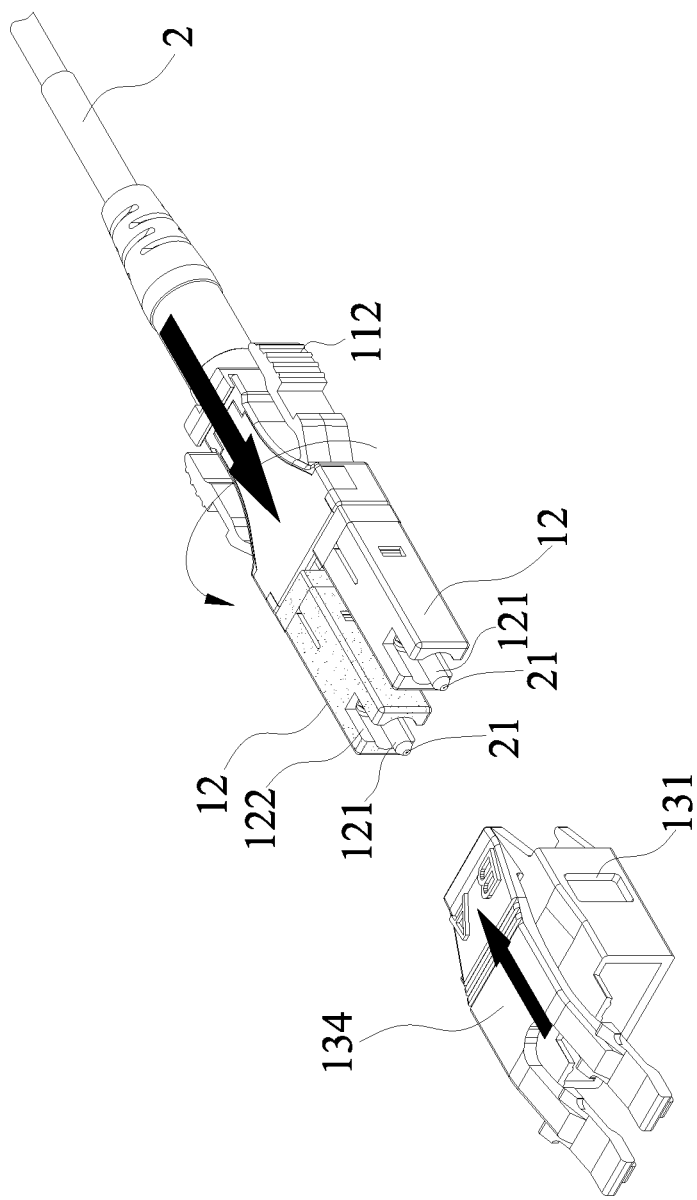
FIG. 5 is a second schematic view showing a status of the first embodiment of the present invention during operation.
Figure 6:
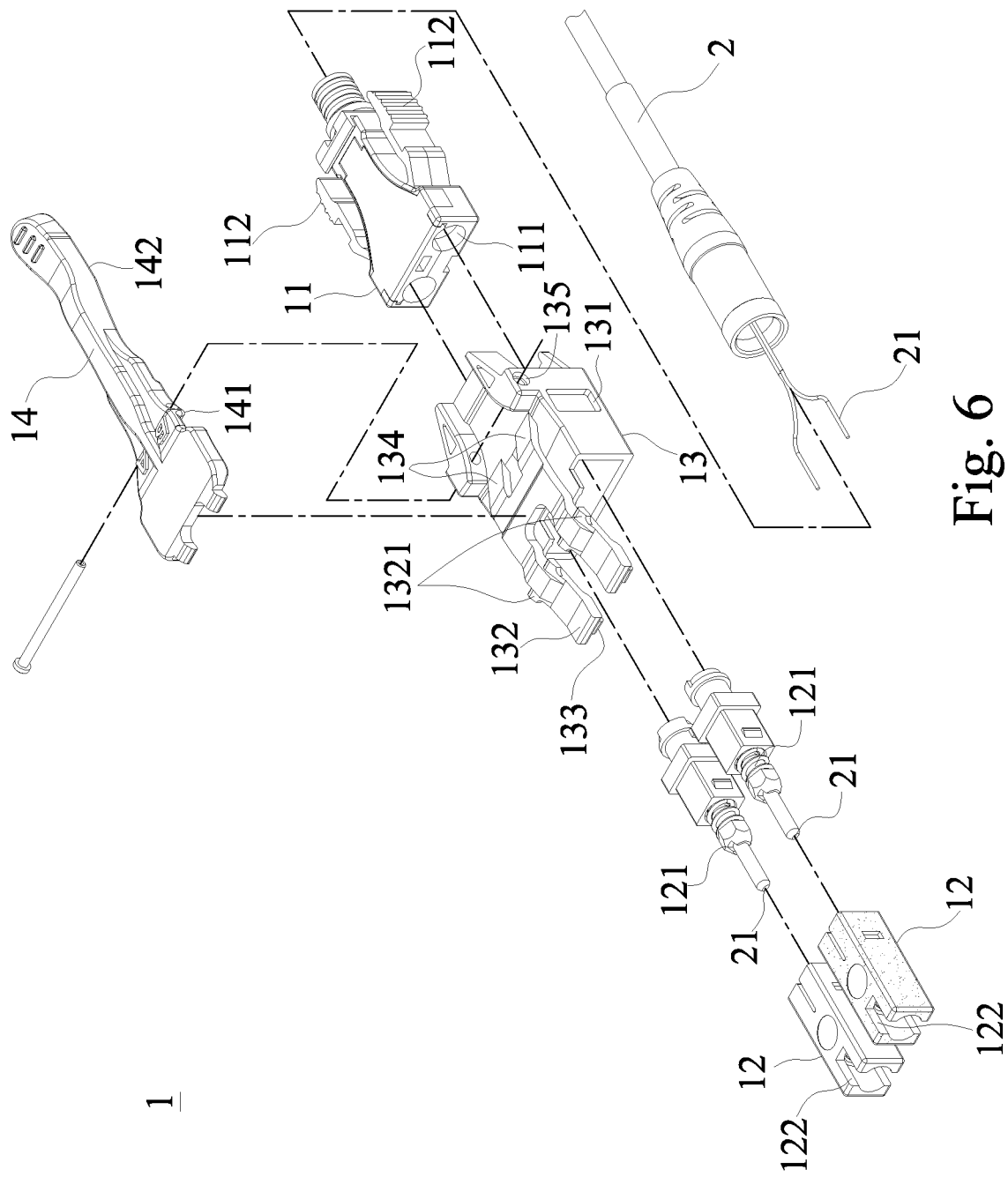
FIG. 6 is an exploded view of second embodiment of the present invention.
Figure 7:
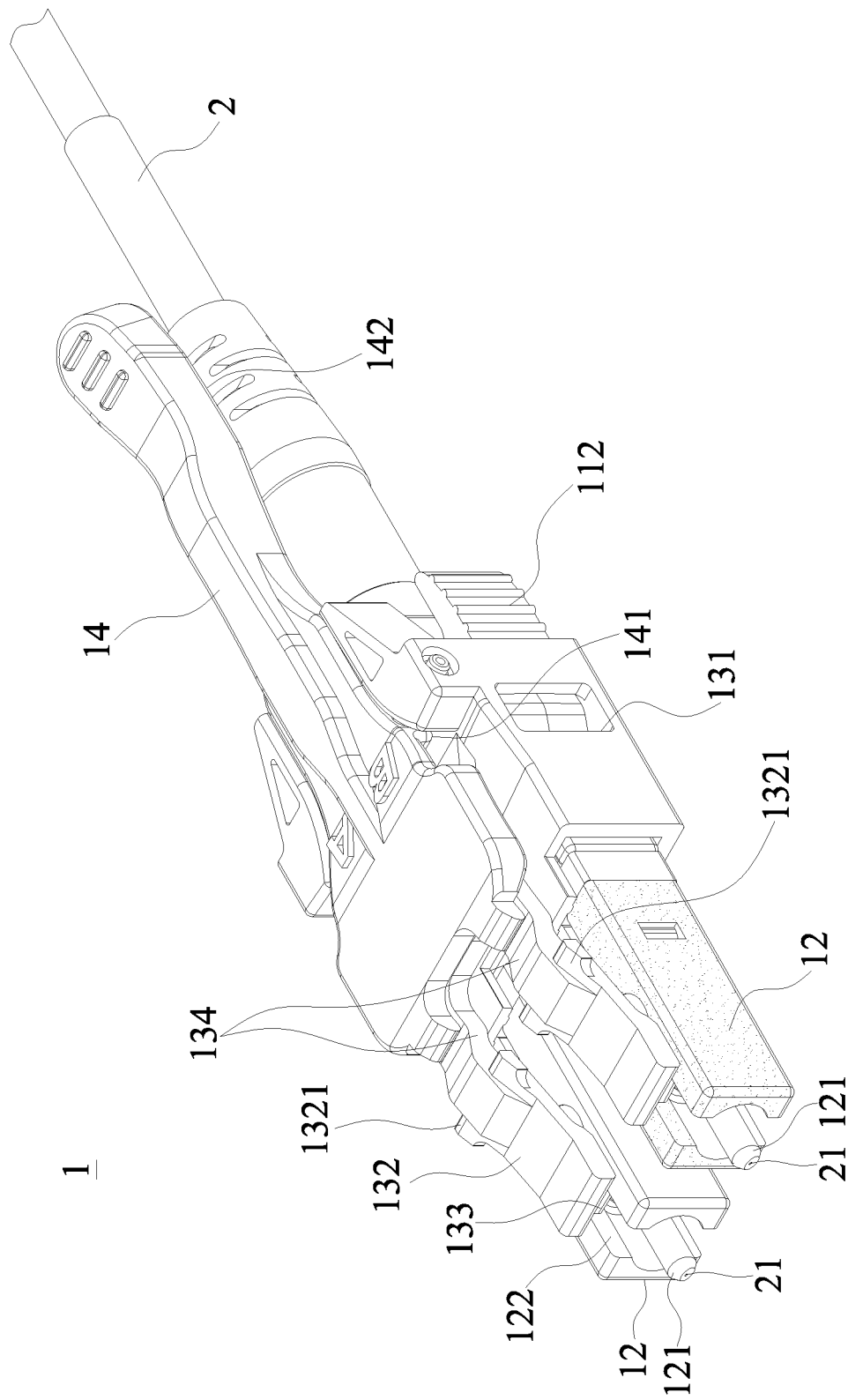
FIG. 7 is a perspective view of second embodiment of the present invention.
Figure 8:
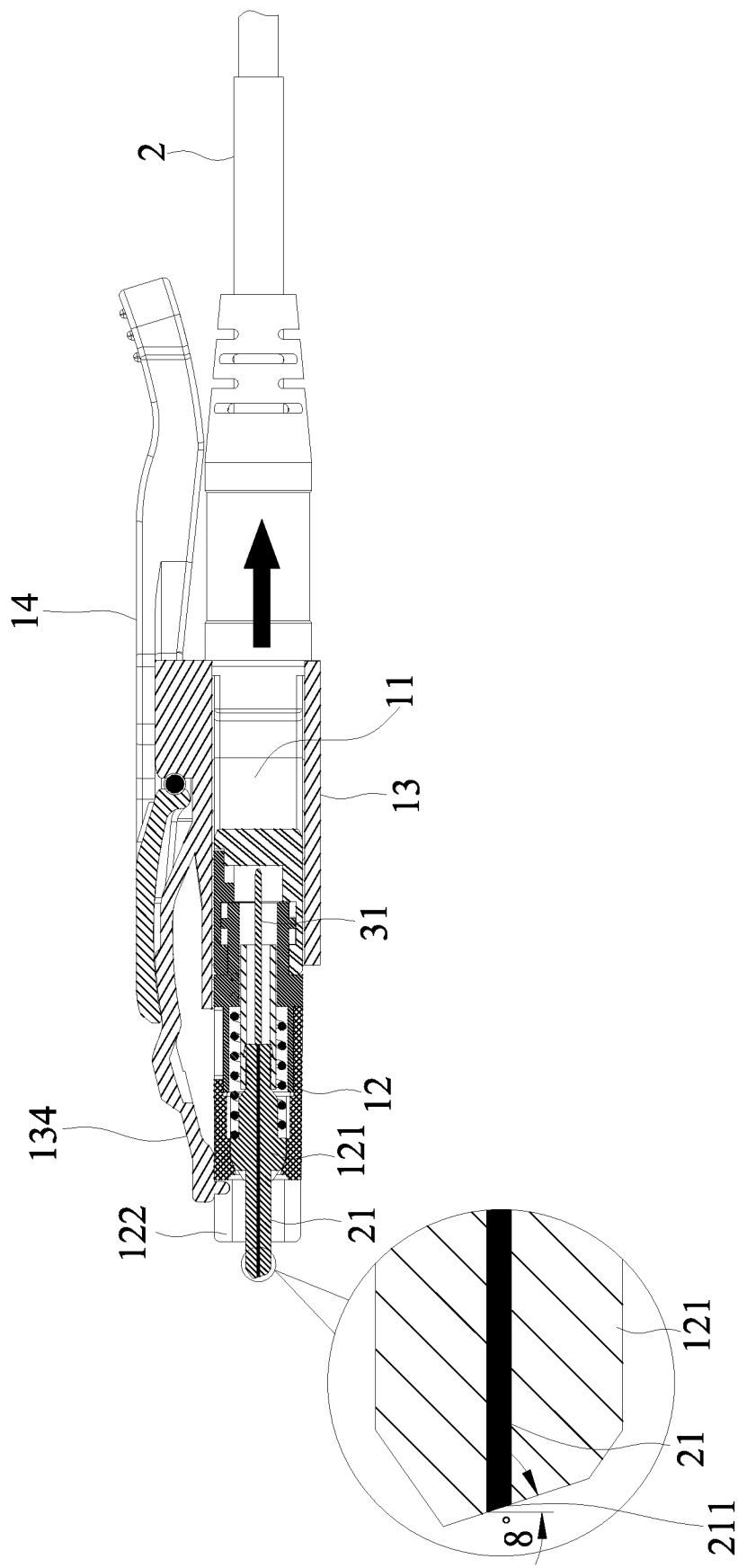
FIG. 8 is an assembled cross-sectional view of the second embodiment of the present invention.
Figure 9:
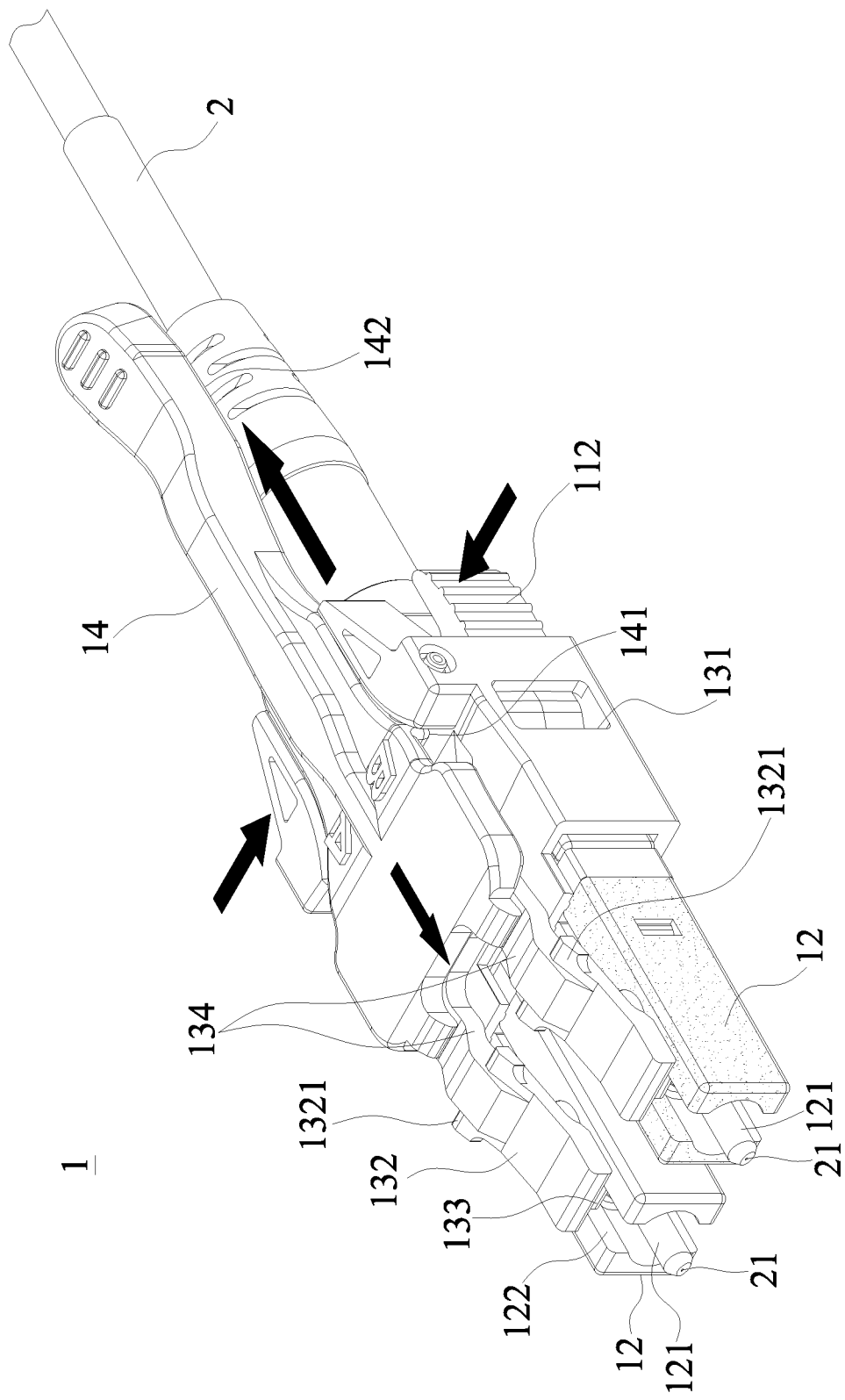
FIG. 9 is a first schematic view showing a status of the second embodiment of the present invention during operation.
Figure 10:
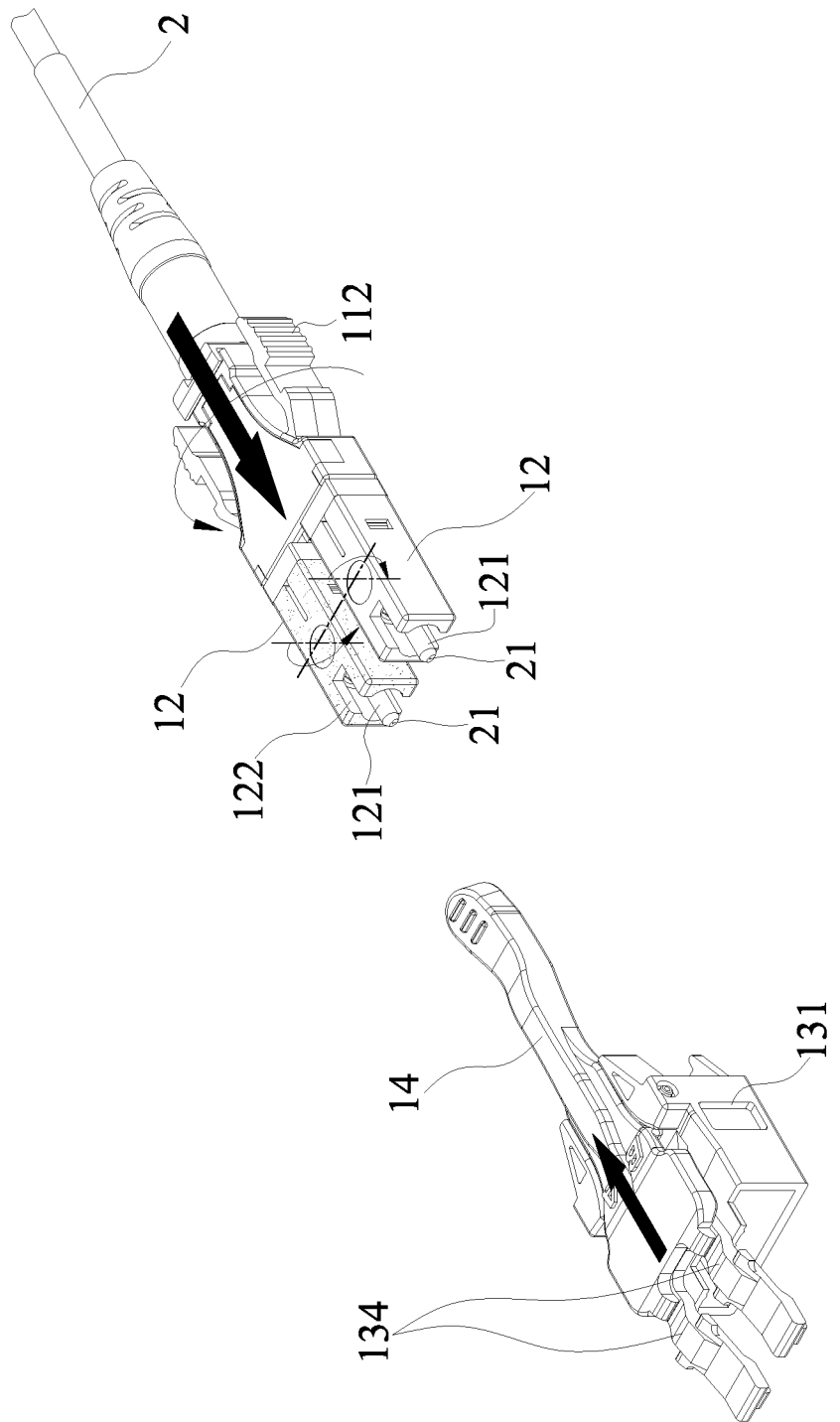
FIG. 10 is a second schematic view showing a status of the second embodiment of the present invention during operation.

Furthermore, the front end face of the fiber optic core wire 21 forms a mating surface 211 with an included angle between 0 degree and 8 degrees, which can increase the positioning effect after the optical signal transmission jumper is converted and adjusted. However, the included angle is limited by the refraction angle of light, as shown in FIG. 3, the included angle of the mating surface 211 is 0 degrees, and as shown in FIG. 8, the included angle of the mating surface 211 is 8 degrees. After actual verification, the maximum value of the included angle can only be 8 degrees.

In summation, As shown in FIGS. 4, 5 and FIGS. 9 to 10, the angles corresponding to the mating surface 211 are different. Take FIGS. 4 to 5 as an example, when it is necessary to adjust the optical signal transmission of the optical fiber signal transmission jumper connector structure 1, there will be no need to remove the optical fiber signal transmission jumper connector structure 1 from the fiber optic socket (if the space allows). Users simply carry out the steps of pressing the two snap hooks 112 to separate the connector body 11 from the rear of the sliding sleeve 13, rotating the connector body 11 by 180 degrees, to let the two fiber optic plugs 12 at the front end switch positions to achieve the purpose of adjusting the transmission direction of the optical signal, and then inserting the connector body 11 from the rear to the front into the sliding sleeve 13 to complete the operation. Taking FIGS. 9-10 as another example, the two mating surfaces 211 of the two fiber optic core wires 21 have an included angle design. Therefore, when the optical fiber signal transmission jumper connector structure 1 of the present invention is to be adjusted for optical signal transmission, the connector body 11 is removed from the back of the sliding sleeve 13 by pressing the two snap hooks 112, rotating the connector body 11 by 180 degrees, to let the two fiber optic plugs 12 at the front end switch positions, and then the two fiber optic plugs 12 are rotated 180 degrees to complete the purpose of adjusting the transmission direction of the optical signal. The direction of the two mating surfaces 211 can correspond to the direction of the fiber optic core wire 21 in the fiber optic socket, and finally the connector body 11 is inserted into the sliding sleeve 13 from back to front to re-fasten the operation to complete the operation. Moreover, the fiber optic core wires 21 with the design of the mating surface 211 can be applied to the two embodiments of the present invention. Obviously, the operation of the above two embodiments is very simple and easy when performing the switching operation of the pair of fiber optic plugs 12, and thus significantly improving the convenience of on-site operation and effectively preventing the top and bottom cover shells from missing.

What is claimed is:

1. An optical fiber signal transmission jumper connector structure, pluggable in a fiber optic socket to achieve a signal connection for transmitting a light signal, comprising:
   a connector body, having a rear end coupled to a fiber optic cable, and a front end configured to be corresponding to the fiber optic cable and divided into two outlet ends, and two fiber optic core wires inside the fiber optic cable are passed out from the two outlet ends respectively, and both outer sides of the connector body have a snap hook;
   a pair of fiber optic plugs, movably disposed in the two outlet ends respectively, and each of the fiber optic plugs having a fiber optic tube therein, to let each of the fiber optic core wires penetrate into each of the fiber optic tubes respectively, and make a section of each of the fiber optic core wires pass through each of the fiber optic tubes to transmit optical signals, and a surface of a front end of each of the fiber optic plugs having at least one guide groove away from the connector body, and the at least one guide groove divides the front end of each of the fiber optic plugs into a plurality of protruding structures; and
   a sliding sleeve, having an accommodating space defined therein, for passing and accommodating the connector body therein, and an outer side of the sliding sleeve having a snap hole respectively for fixing the two snap hooks to complete an assembly, and a top surface of the sliding sleeve having a pair of buckle portions engaged and fixed into the fiber optic socket, the pair of buckle portions is an arm structure and protrudes toward a direction away from the fiber optic cable, and an end of each of the pair of buckle portions, which is away from the fiber optic cable, having a positioning hook configured to be corresponsive to each of the guide grooves, and each of the positioning hooks is disposed in each of the guide grooves;
   wherein, the two snap hooks are pressed to separate the connector body from the rear of the sliding sleeve, and after rotating the connector body by 180 degrees, the connector body is plugged from the rear to the front into the sliding sleeve again to complete the operation of switching position of the two fiber optic plugs,
   each of the positioning hook is located on a bottom surface of the pair of buckle portions, and
   the pair of buckle portions is higher than the guide grooves.

2. The optical fiber signal transmission jumper connector structure as claimed in claim 1, wherein the guide groove is arranged in a direction corresponding to a linear direction of plugging the connector body into the sliding sleeve.

3. The optical fiber signal transmission jumper connector structure as claimed in claim 1, wherein the two buckle portions are integrally formed at a front end of an elastic plate, and a rear end of the elastic plate is extended to and disposed at a rear end of the sliding sleeve, and formed into a forwardly extended and curved form, and the center of each of the buckle portions is extended horizontally towards both sides and out from two latch points and engaged and fixed into the fiber optic socket, and the two positioning hooks are disposed under a tip of each of the buckle portions, and the elastic plate can be pressed to separate the two buckle portions from the fiber optic socket to achieve a release effect.

4. The optical fiber signal transmission jumper connector structure as claimed in claim 3, wherein the front end face of the fiber optic core wire forms a mating surface with an included angle between 0 degree and 8 degrees.

5. The optical fiber signal transmission jumper connector structure as claimed in claim 1, wherein the two buckle portions are integrally formed at a front end of the sliding sleeve, and a rear end of the sliding sleeve has a pivoting portion for movably installing a release lever, and a front end of the release lever is extended to a position corresponding to the two buckle portions, so that the release lever is extended backward to the rear of the sliding sleeve.

6. The optical fiber signal transmission jumper connector structure as claimed in claim 5, wherein the front end face of the fiber optic core wire forms a mating surface with an included angle between 0 degree and 8 degrees.

7. The optical fiber signal transmission jumper connector structure as claimed in claim 5, wherein the bottom of the release lever proximate to the pivoting portion has a raised portion, and the raised portion is provided for normally abutting a rear section of the release lever against a surface of the fiber optic cable.

8. The optical fiber signal transmission jumper connector structure as claimed in claim 7, wherein the release lever has a rear section configured to be corresponsive to an insert direction of user's finger and formed into an curved surface which is upturned, and when the user's finger is inserted into a gap formed between the curved surface and the fiber optic cable during an operation, the two buckle portions are separated from the fiber optic socket to achieve a release effect.

9. The optical fiber signal transmission jumper connector structure as claimed in claim 8, wherein the curved surface has an upturned angle falling within a range from 10 degrees to 35 degrees.

\* \* \* \* \*